July 9, 1963 E. R. ESSENMACHER 3,096,643
THREAD TORQUE TENSION INDICATOR

Filed Jan. 25, 1960 3 Sheets-Sheet 1

INVENTOR.
Ernest R. Essenmacher
BY
C. P. Barnard
ATTORNEY

July 9, 1963     E. R. ESSENMACHER     3,096,643
THREAD TORQUE TENSION INDICATOR
Filed Jan. 25, 1960     3 Sheets-Sheet 3

INVENTOR.
*Ernest R. Essenmacher*
BY
*R. P. Barnard*
ATTORNEY

United States Patent Office 3,096,643
Patented July 9, 1963

3,096,643
THREAD TORQUE TENSION INDICATOR
Ernest R. Essenmacher, Warren, Mich., assignor to General Motors Corporation, Detroit, Mich., a corporation of Delaware
Filed Jan. 25, 1960, Ser. No. 4,488
9 Claims. (Cl. 73—133)

This invention relates to a thread testing device and more particularly to a combined screw torque and tension measuring instrument.

Increases in the quantity of threaded fasteners being used in industry today has created a demand for a simple precision instrument to measure torque and tension of such threaded devices so that large orders from various manufacturers may be randomly checked with convenience and economy to insure that required standards are maintained. In the past, inspection of threaded fastening members has been laborious and time consuming because satisfactory measurements could only be made on separate torque and tension measuring instruments. Some attempts have been made to combine torque and tension measuring instruments but none of them have been well suited to repetitive, rapid testing of threaded devices.

It is, therefore, an object of this invention to provide a simple and more economical thread measuring device comprising a minimum of parts and functionally adapted to rapid repetitive testing. It is also an object of this invention to provide a single torque and tension responsive device to eliminate torque and tension gauge adjustment for each individual test and to provide an inspection instrument requiring only a change of the test pieces from test to test.

Other objects and advantages of the present invention will be apparent from the following detailed description thereof and the accompanying drawing in which.

Figure 1:
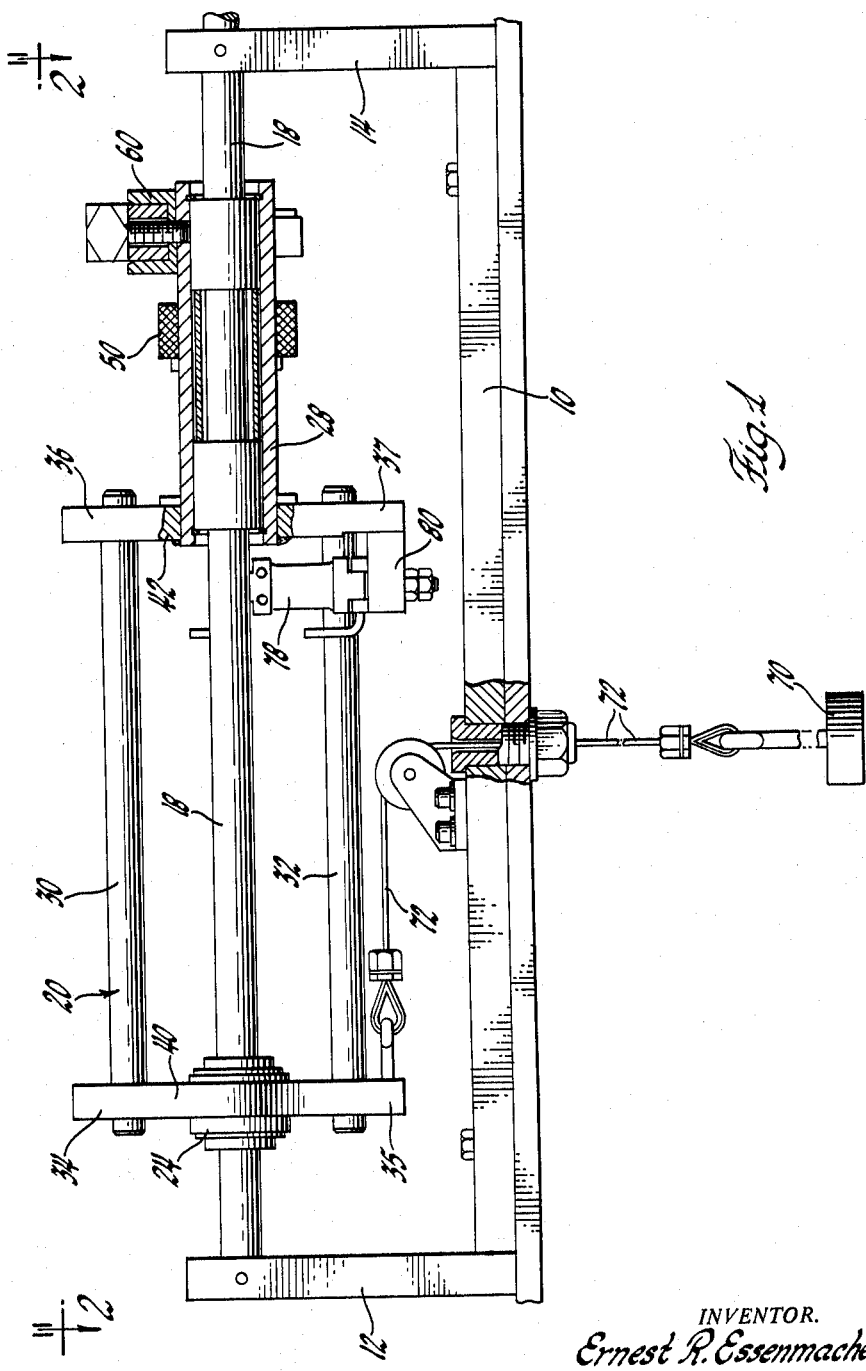
FIGURE 1 is a side elevational view of the preferred embodiment of my device.
Figure 2:
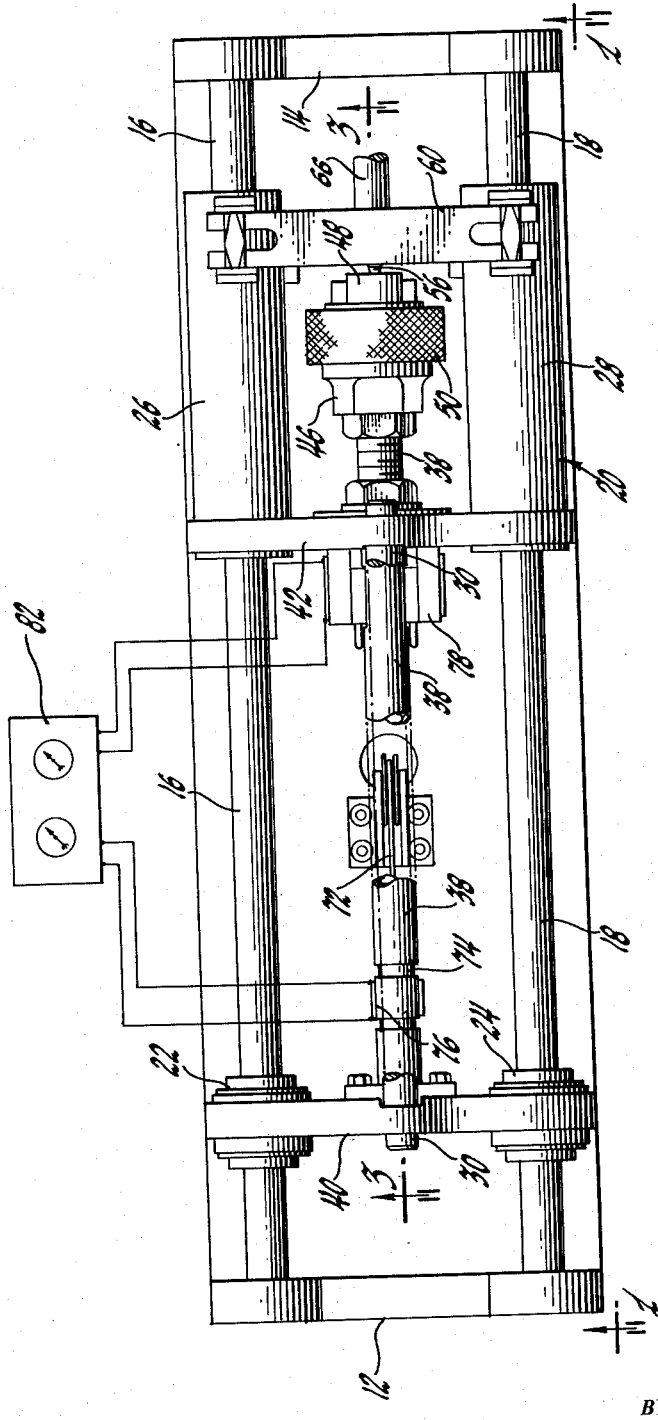
FIGURE 2 is a plan view of the device of FIGURE 1.

Referring to the drawings, a test stand having a base 10 and upstanding support walls 12, 14 is shown. A pair of slide bars 16, 18 are supported longitudinally of the test stand and a carrier member generally designated 20 is slidably supported on the slide bars by bearing members 22, 24, 26 and 28. Support bars 30, 32 extend between flange extensions 34, 36 and 35, 37 of the carrier member and serve to rigidly connect the bearing members 22, 24 with the bearing members 26, 28.

Figure 3:
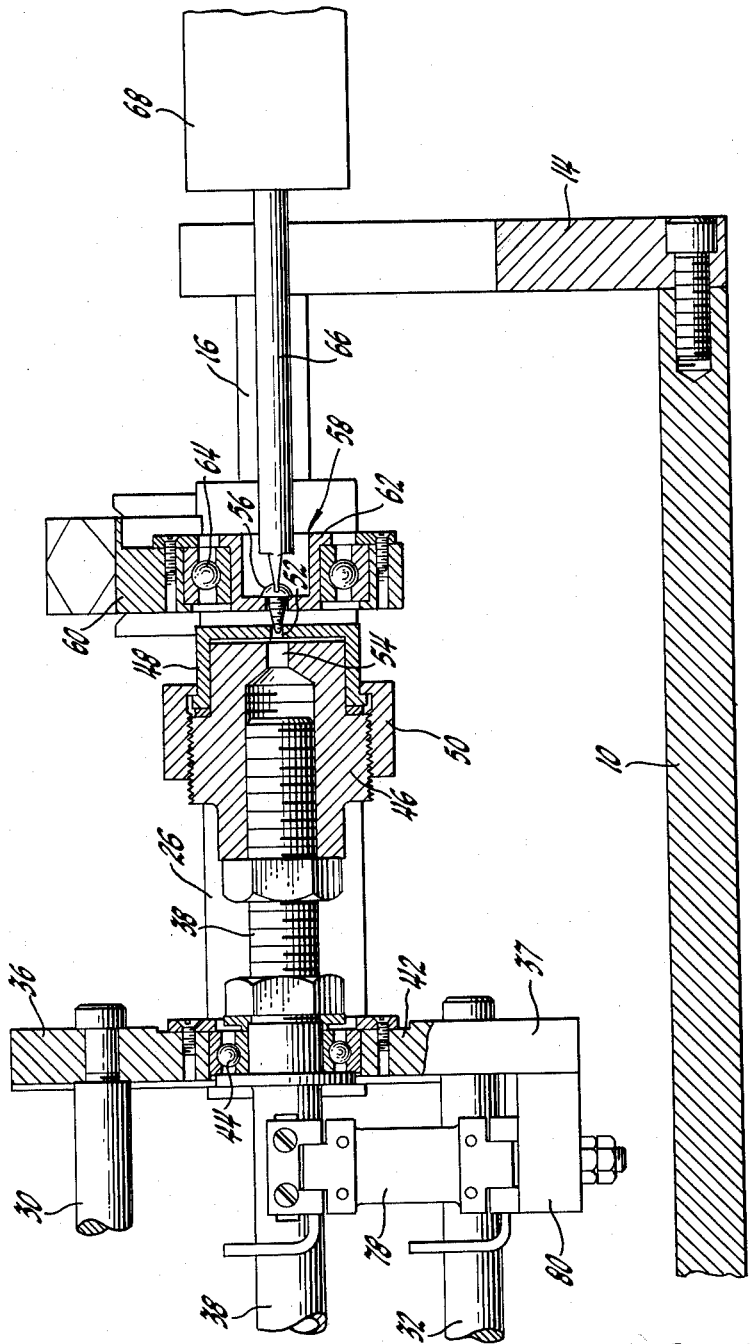
FIGURE 3 is a cross sectional view taken along the line 3—3 in FIGURE 2.

A torque and tension responsive tubular member 38 is centrally supported by the carrier member 20 and rigidly fixed to a cross member 40 connecting the bearing members 22, 24. As shown in FIGURE 3, the other end of the tubular member is supported in a cross member 42 connecting the bearing members 26, 28 by a ball bearing 44 that freely supports the tubular member 38 within the cross member 42. A workholder 46 is fixedly secured to one extremity of the tubular member 38 and is adapted to rigidly support a workpiece 48 by a threaded fastener assembly 50. The workpiece 48 has a centrally located threaded or unthreaded opening 52 that is coaxially aligned with a screw accommodation recess or opening 54 in the workholder 46. The threads in the opening 52 may be hardened for a purpose to be hereinafter explained.

A bolt or screw member 56 having threads thereon to be tested is rotatably supported in coaxial alignment with the opening 52 and the accommodation recess 54 by a screw holding device 58. The screwholder 58 comprises a support bar 60 rigidly connected to the bearing members 26, 28 and centrally supporting the screw holding cylindrical member 62. A ball bearing 64 is interposed between the cylindrical member 62 and the support bar 60 so that the screw member 56 may be substantially frictionlessly rotated.

A drive member 66 cooperable with the screw or bolt member 56 is coaxially aligned therewith and associated with a power source such as a variable speed electric motor 68. Power source 68 is normally fixed with respect to the base 10. A counterbalance 70 is connected to the carriage 20 by a line 72 so that the carriage is biased toward the power source to maintain the screw member and drive member in engagement.

The tubular member 38 is provided with a portion of reduced diameter 74 and a suitable conventional tension gage 76 is operatively associated therewith. A suitable conventional torsional strain gage 78 is mounted on another portion of the tubular member and supported by bracket 80. A conventional recording instrument 82 is connected to the tension gage and torsion gage to record the outputs thereof.

In operation, a suitable workpiece 48 is mounted in the workholder 46 and is provided with a suitable unthreaded opening or with a threaded opening having threads corresponding to the threads on a screw or bolt member to be tested. The test piece is mounted in a screw holding device and positioned adjacent the workpiece 48. The drive member 66 is next drivingly engaged with the test member and the test member is driven into the workpiece while tensile and torque measurements are taken and recorded by the gages as necessary. In the preferred embodiment a special workpiece is used that is designed to provide hardened threads that permit the tested screw to be driven therein to failure of the threads on the screw. In this manner, the only manual operation required between tests is the replacement of the threaded member being tested. Of course, in some circumstances it may be desirable to test a workpiece and, therefore, a hardened screw member could be utilized; while in other cases both threaded members might be provided with standard threads. It is to be noted that as the test member is driven into the workpiece, the supporting cylindrical member 62 is rotatably held by the ball bearing 64 so that the torsion gage 78 measures substantially only the torsion obtained by the threaded engagement.

In addition, the test setup is of apparent simplicity in that only a test screw need be replaced and positioned from test to test within the simple support mechanism shown. There are no special alignment adjustments to be made and the test gages are not disturbed by repeated changes of test materials.

Although the machine of the present invention has been illustrated and described herein to a detailed extent, in appropriate circumstances the invention is not be regarded as limited correspondingly in scope but as including all changes and modifications coming within the terms of the appended claims.

I claim:

1. A thread testing machine comprising a frame member, integral torque and tension responsive means supported by said member, means to rigidly support a thread receiving member in torque and tension transferring relation with said torque and tension responsive means, torque and tension recording means associated with said torque and tension responsive means, means for rotatably supporting a threaded test member in a fixed position adjacent said thread receiving member, and power means associated with said test member to drivingly engage said thread receiving member and said threaded test member.

2. A thread testing machine comprising a frame member, integral torque and tension responsive means supported by said member, means to rigidly support a thread receiving member in torque and tension transferring relation with said torque and tension responsive means, torque and tension transducer means associated with said torque and tension responsive means, means for rotatably supporting a threaded test member in a fixed position adjacent said thread receiving member, a power source adapted to drivingly associate said threaded test member and said thread receiving member, and means associated with said tension and torque transducer means to record the output thereof.

3. A thread testing machine comprising a slidable carriage member, integral torque and tension responsive means supported by said member, means to rigidly support a thread receiving member in torque and tension transferring relation with said torque and tension responsive means, torque and tension recording means associated with said torque and tension responsive means, rotatable means mounted on said carriage member for supporting a threaded test member in a fixed position adjacent said thread receiving member, power means to drivingly associate said threaded test member and said thread receiving member, means biasing said carrier member and said torque and tension responsive means toward said power means, and bearing means interposed between said rotatable means and said carriage member to eliminate frictional drag therebetween.

4. A thread testing machine comprising a frame member, a torque and tension responsive tubular member supported by said frame member, a portion of said tubular member having a reduced diameter to form a thin wall section, tension responsive means associated with said portion of said tubular member, torque responsive means associated with another portion of said tubular member, torque and tension recording means associated with said torque and tension responsive means, means to rigidly support a thread receiving member in torque and tension transferring relation with said torque and tension responsive tubular member, and means for rotatably supporting a threaded test member in a fixed position adjacent said internally threaded member so as to permit said test member to be driven therein.

5. A thread testing machine comprising a frame member, a torque and tension responsive tubular member supported by said frame member, a portion of said tubular member having a reduced diameter to form a thin wall section, tension responsive means associated with said portion of said tubular member, torque responsive means associated with another portion of said tubular member, torque and tension recording means associated with said torque and tension responsive means, means to rigidly support a thread receiving member in torque and tension transferring relation with said torque and tension responsive tubular member, rotatable means mounted on said frame member for supporting a threaded test member in a fixed position adjacent said thread receiving member so as to permit said test member to be driven therein, and bearing means interposed between said rotatable means and said frame member to eliminate frictional drag therebetween.

6. A thread testing machine comprising a frame member, a torque and tension responsive tubular member supported by said frame member, a portion of said tubular member having a reduced diameter to form a thin wall section, tension responsive means associated with said portion of said tubular member, torque responsive means associated with another portion of said tubular member, torque and tension recording means associated with said torque and tension responsive means, means to rigidly support a thread receiving member in torque and tension transferring relation with said torque and tension responsive tubular member, a rotatable means mounted on said frame member for supporting a threaded test member in a fixed position adjacent said thread receiving member so as to permit said threaded test member to be driven therein, bearing means interposed between said rotatable means and said frame member to eliminate frictional drag therebetween, a power source, and means connected to said power source for drivingly engaging said thread receiving member and said threaded test member.

7. A thread testing machine comprising a frame member, a torque and tension responsive tubular member supported by said frame member, a portion of said tubular member having a reduced diameter to form a thin wall section, tension responsive means associated with said portion of said tubular member, torque responsive means associated with another portion of said tubular member, torque and tension recording means associated with said torque and tension responsive means, means to rigidly support a thread receiving member in torque and tension transferring relation with said torque and tension responsive tubular member, rotatable means mounted on said frame member for supporting a threaded test member in a fixed position adjacent said thread receiving member so as to permit said threaded test member to be driven therein, bearing means interposed between said rotatable means and said frame member to eliminate frictional drag therebetween, a power source, means connected to said power source adapted for drivingly engaging said thread receiving member and said threaded test member, and means to bias said frame member and said torque and tension responsive means toward said power source.

8. A thread testing fixture comprising a frame, an integral torque and tension responsive member having a first portion fixedly secured to said frame, a second portion of said responsive member being freely supported by said frame, means to rigidly secure a thread receiving member to said torque and tension responsive member, means for rotatably supporting a threaded member in a fixed position adjacent said thread receiving member, means to drivingly associate said thread receiving member and said threaded member, and means to measure torque and tension imparted to the responsive member by the association of said thread receiving member and said threaded member.

9. A thread testing machine comprising a frame, a tension and torque responsive member, one end of said responsive member being fixedly secured to said frame, a central portion of said responsive member being freely supported by said frame, clamping means fixedly secured to the other end of said member and adapted to fixedly retain a thread receiving member, a support member fixedly secured to said frame adjacent said clamping means, holding means provided in said support member to freely support a threaded member, means to drivingly associate said thread receiving member and said threaded member, and means to record torque and tension imparted to said responsive member by the association of said thread receiving member and said threaded member.

References Cited in the file of this patent
UNITED STATES PATENTS

| | | |
|---|---|---|
| 2,030,464 | Nilson | Feb. 11, 1936 |
| 2,795,131 | Booth | June 11, 1957 |
| 2,957,342 | Hanneman | Oct. 25, 1960 |